July 29, 1969  S. ENGELSTEIN  3,457,697
MICROFICHE READER-FILLER MACHINE
Filed June 22, 1966  5 Sheets-Sheet 1
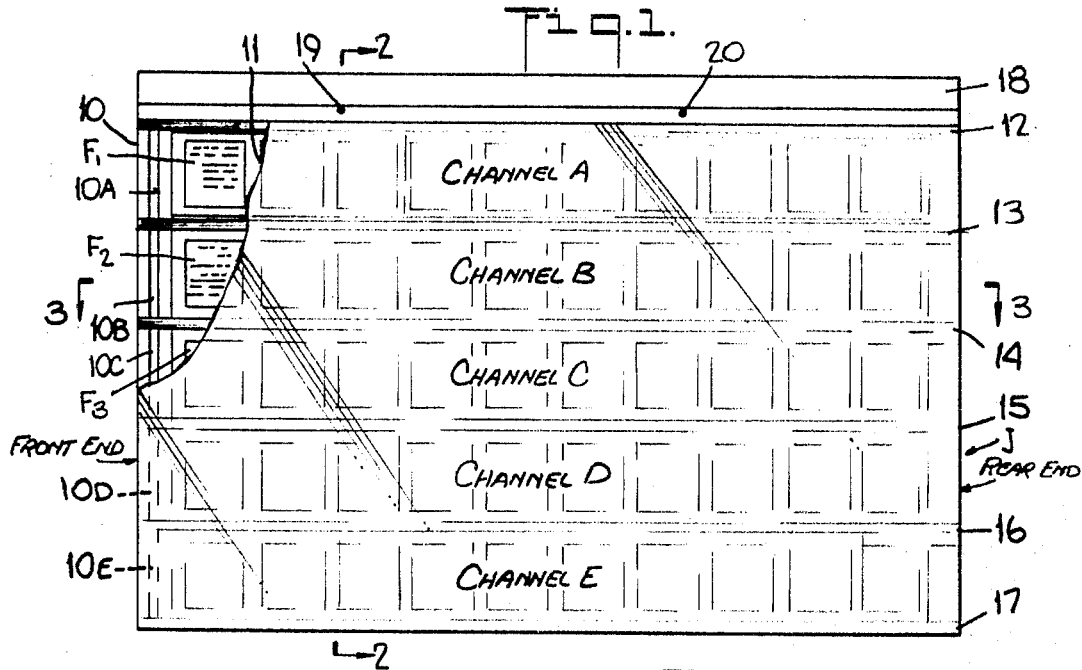
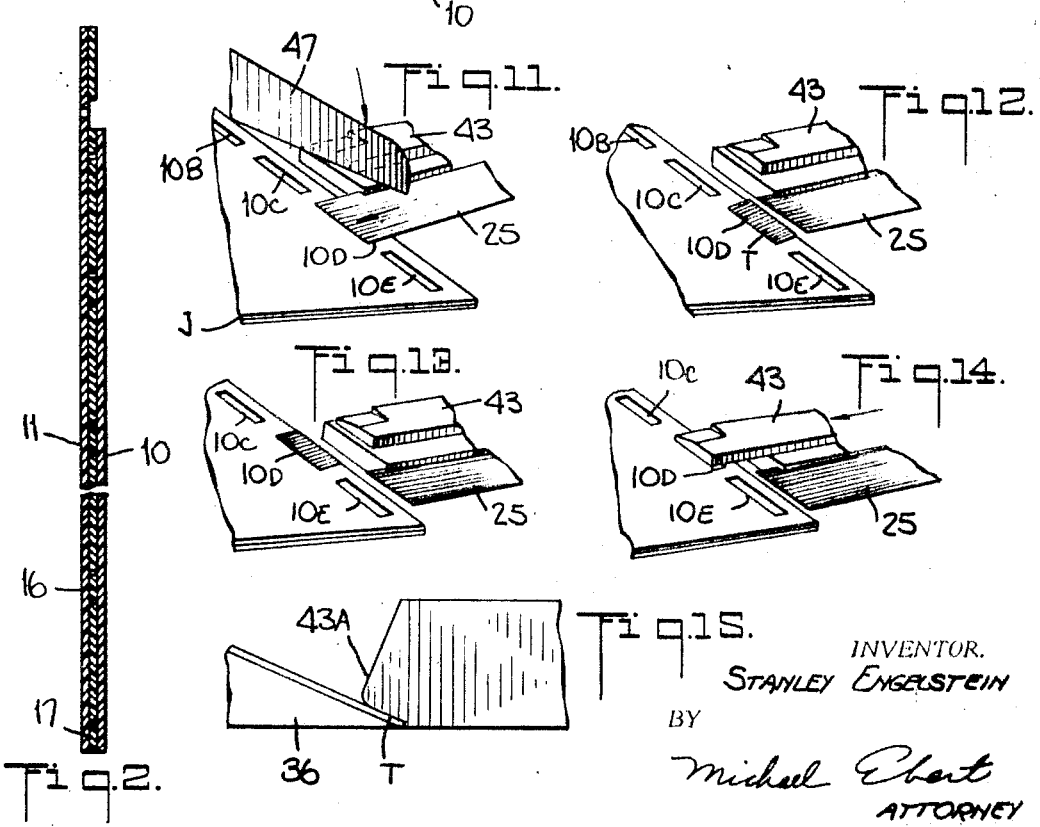
INVENTOR.
STANLEY ENGELSTEIN
BY
Michael Ebert
ATTORNEY

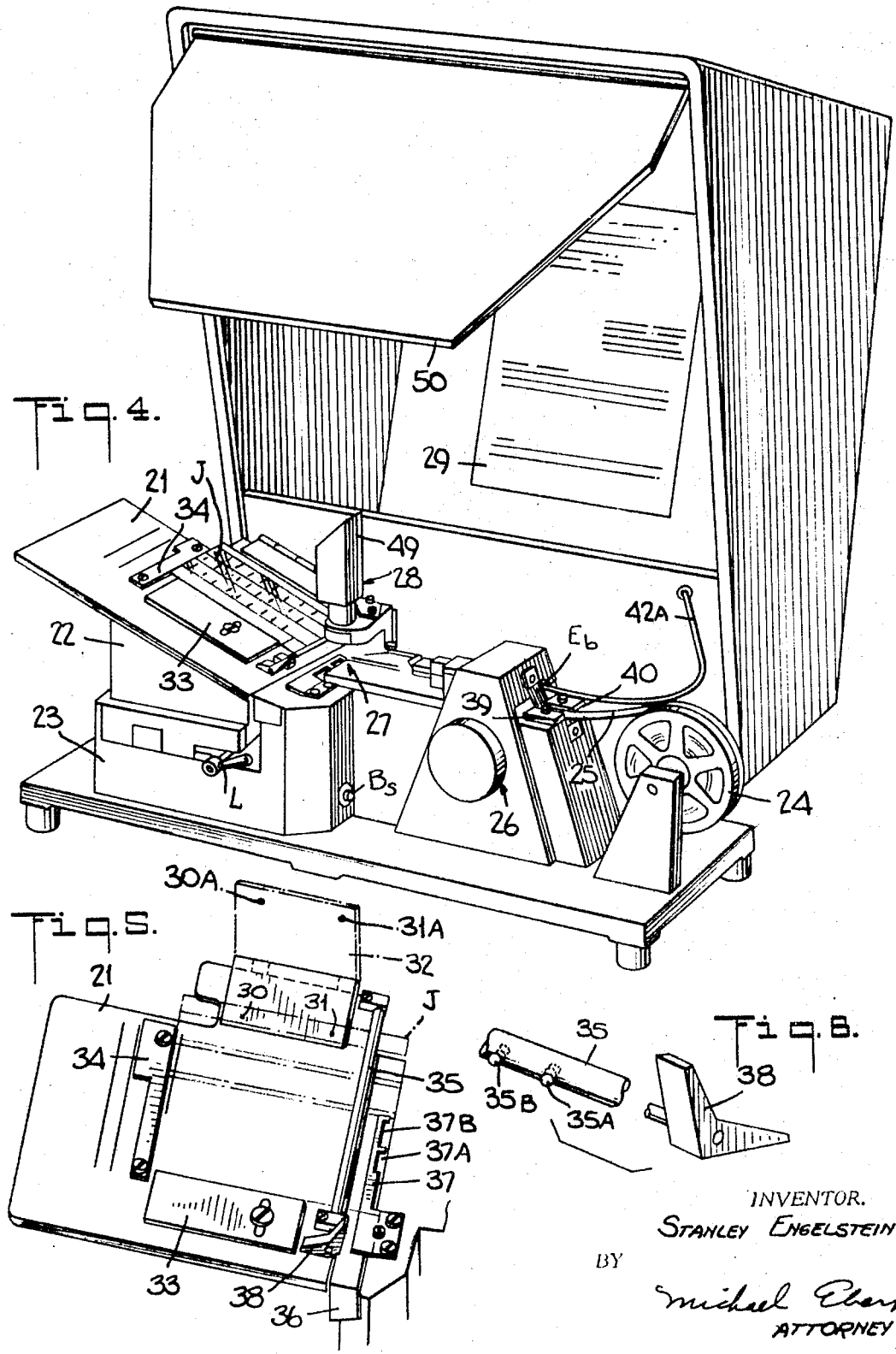

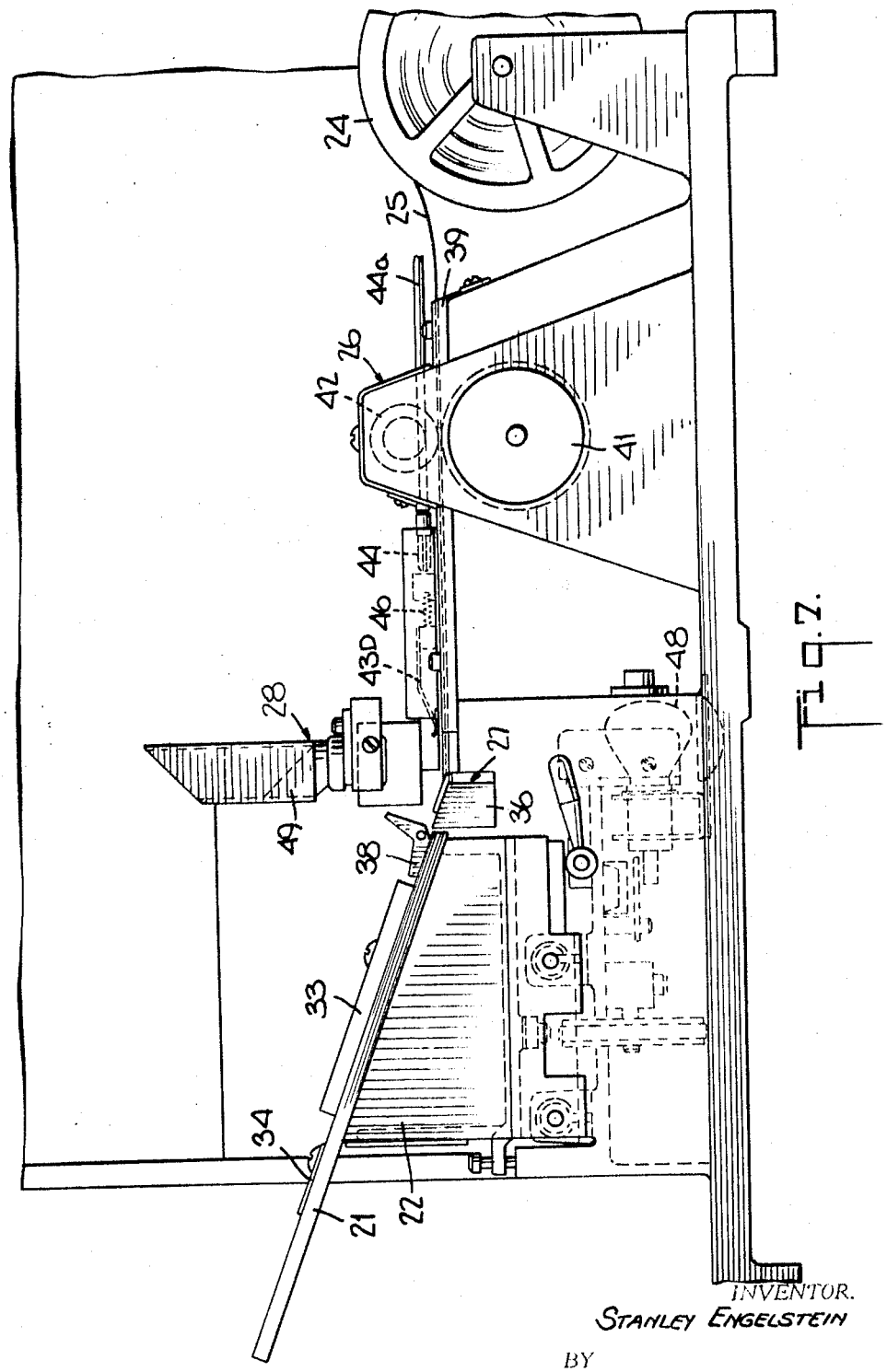

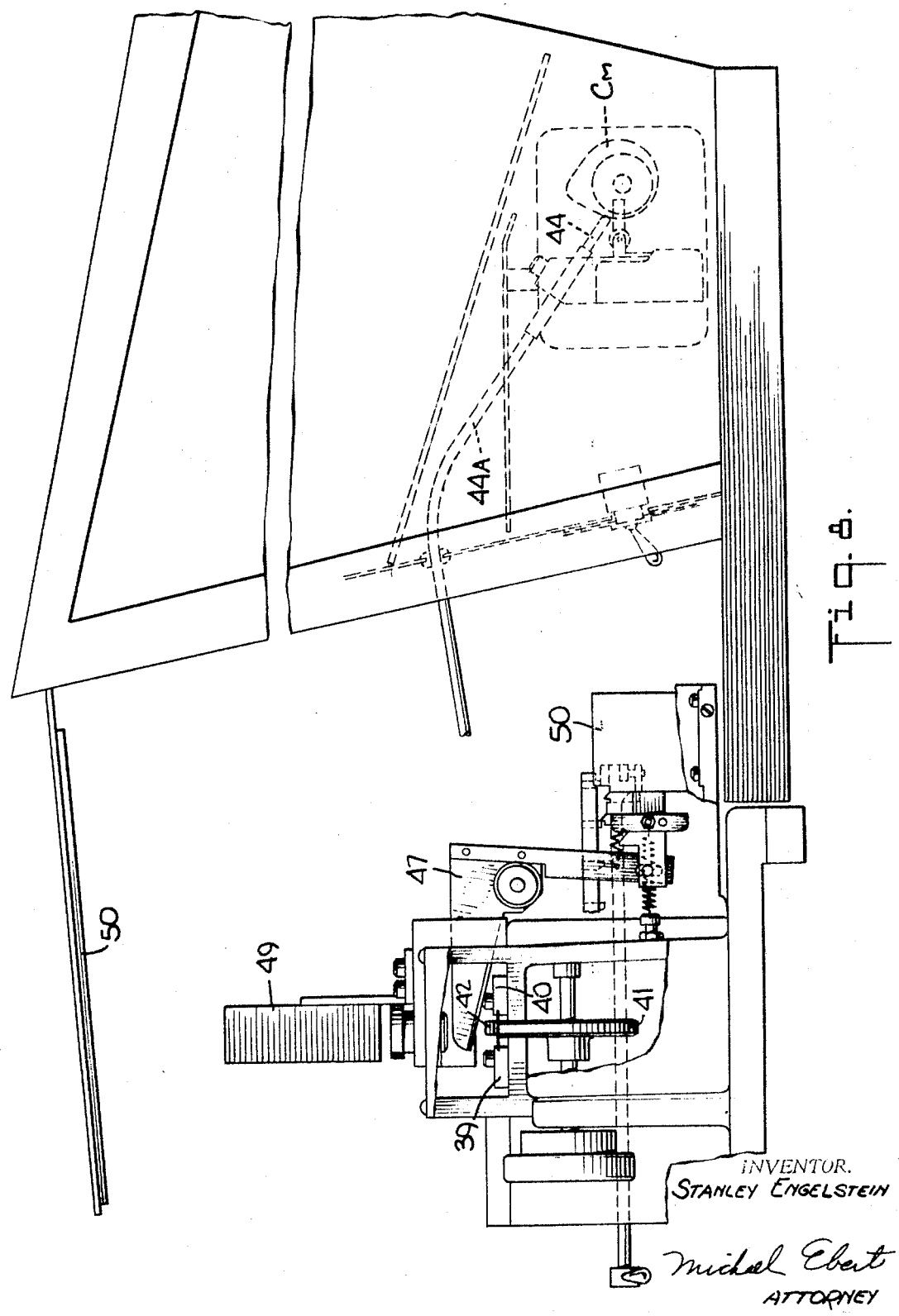

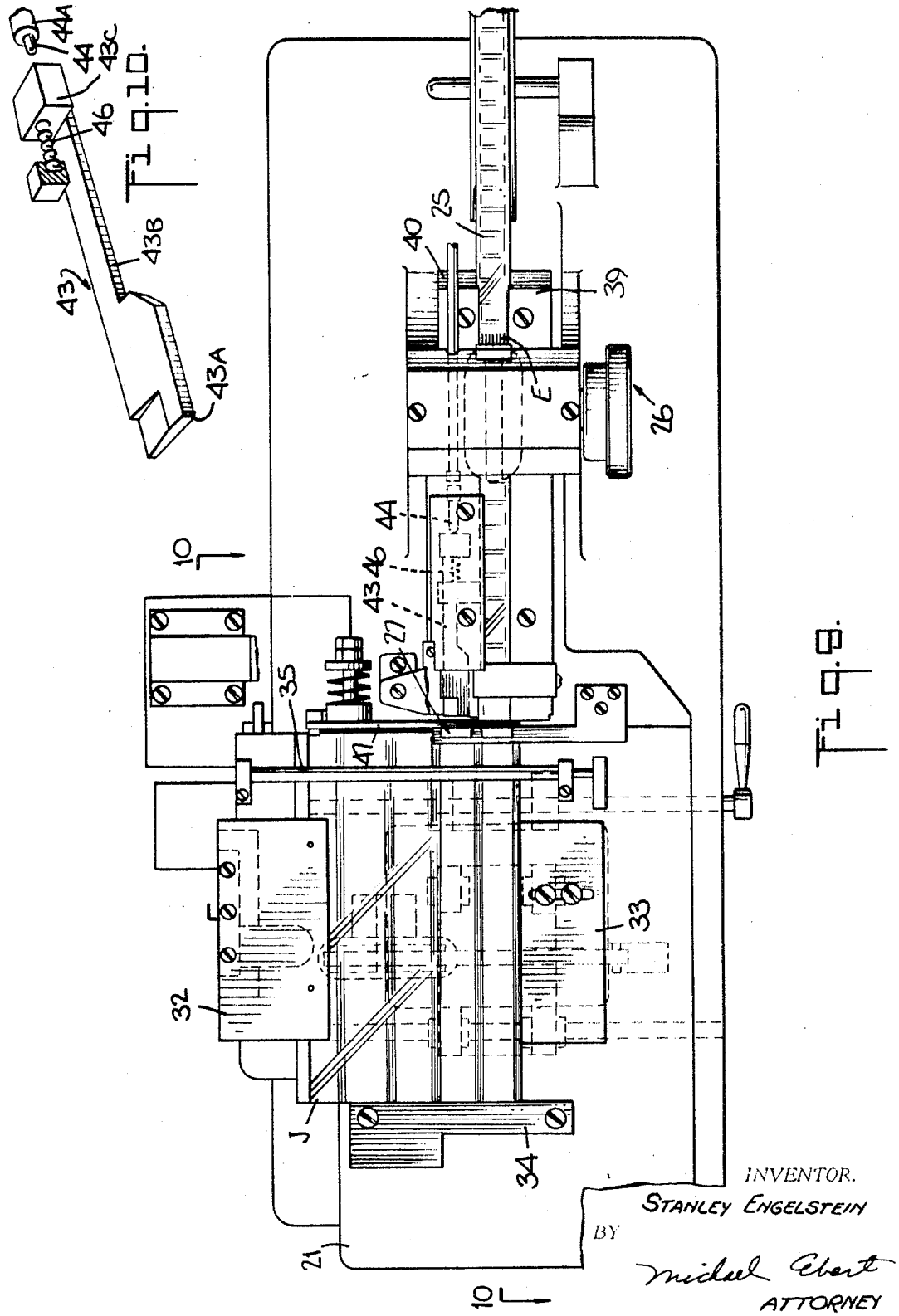

United States Patent Office
3,457,697
Patented July 29, 1969

3,457,697
MICROFICHE READER-FILLER MACHINE
Stanley Engelstein, New York, N.Y., assignor to NB Jackets Corporation, Long Island City, N.Y., a corporation of New York
Filed June 22, 1966, Ser. No. 559,569
Int. Cl. B65b 61/00; G03b 23/08, 21/28
U.S. Cl. 53—123                                         6 Claims

ABSTRACT OF THE DISCLOSURE

A machine for loading microfiche or multiple-chamber jackets with microfilm strips. The jacket to be filled is supported on an inclined platform which is shiftable stepwise in a path normal to the film trackway. A pusher is supported for reciprocal movement at a position in parallel relation to the film trackway, such that when the trackway is aligned with a particular chamber in the jacket, the pusher is then aligned with the chamber directly adjacent thereto. In operation, film projected from the trackway is inserted into the particular chamber and is then cut, leaving a tail outside this chamber. The platform is then indexed to align the tail with the pusher, and finally the pusher is actuated to push in the tail to complete the insertion.

This invention relates generally to apparatus for cutting a microfilm strip into sections and for inserting the sections into the chambers of a protective jacket, and more particularly to a machine for filling microfiche jackets, the microfilm images being optically vertified before insertion.

My Patent 3,238,655, entitled, "Microfiche Master," discloses a microfiche master composed of a transparent jacket formed by two plastic panels laminated together by ribs which are spaced to define a series of chambers adapted to accommodate microfilm frames. The loaded, multi-chambered jacket functions as a microfiche master from which reference copies may be made. This is effected by contact-printing through the front panel which is very thin, the back panel being thicker to impart body to the jacket. Such microfiche masters are highly useful in storing and disseminating information. Because of the unitary nature of microfiche, it is readily adaptable to virtually all indexing and coding systems.

My patent, 3,238,655 refers to a film-feeding machine disclosed in my earlier patent 2,937,483, as a means for sectioning a film strip and for inserting the cut pieces into the chambers of the microfiche jacket. By the use of this machine, insertions are made by placing the microfiche jacket on an inclined platform mounted on a sliding carriage shiftable along rails to register successive jacket chambers with the leading edge of the incoming film which is guided along a trackway terminating adjacent the edge of the platform. In operation, a desired section of the film strip constituted by one or more microfilm frames is advanced into a selected chamber, the trailing edge of the section is cut, and the platform is then indexed to the next chamber position for a new insertion.

To facilitate the insertion of film strips, the microfiche jacket is provided adjacent the ends of the chambers with cut-outs or notches, thereby making it possible to insert the film laterally at an angle to the plane of the jacket rather than in endwise direction, which entails exact alignment of the film with the plane of the jacket. Since a flexible film has a tendency to curl, the advantage of angular insertion is that the angle of insertion is not critical, for the film entering the cut-out or notch then bends inwardly into the chamber and is admitted without difficulty. This is the reason why the platform of the film-feeding machine is inclined relative to the film trackway.

The film section is sliced at a point directly adjacent the edge of the jacket. When the jacket is of the type wherein the notch through which the film enters the chamber is displaced from this edge, the cut section is therefore not fully inserted and a short tail thereof remains exposed. If a subsequent insertion is to be made in the same chamber, the tail is objectionable for it prevents a new insertion. Thus it becomes necessary to employ a pusher element to clear the notch and thereby complete the insertion. Heretofore, the use of a pusher entailed an additional operating step and added to the time consumed in filling the jacket.

Accordingly, it is the main object of this invention to provide an improved machine for cutting microfilm strip into sections including one or more images and for fully inserting said sections into a microfiche jacket.

Among the significant features of a machine in accordance with the invention, are:

(a) A reader is included for verifying the microfilm image before insertion in the jacket.

(b) Exact cutting between images is ensured by exposing the knife on the screen of the reader.

(c) The machine automatically cycles through three functions, namely, film-cutting, jacket-indexing, and notch-clearing, the latter function being carried out automatically by a pusher element.

(d) The machine includes a platform having guide and hold-down means to register the jacket in precise relation to the film track for automatic alignment of the film chambers.

(e) The film-advancing mechanism cleans the film as it is being filled into the jacket, and avoids fingerprints and other film damage.

Also an object of the invention is to provide a compact, low-cost filler-reader machine for loading microfiche jackets or similar multi-chamber cards, which machine is efficient and reliable in operation.

Briefly stated, these objects are accomplished in a machine in which the microfiche jacket to be filled is supported on an inclined platform which is shiftable stepwise in a path at right angles with respect to a film trackway and a pusher element in parallel relation therewith whereby when the trackway is aligned with a selected chamber in the microfiche jacket, the pusher element is then aligned with the next adjacent chamber. A film slicer is interposed between the platform and the trackway and serves to cut the inserted portion of the film from the film strip on the trackway.

The arrangement is such that after a predetermined section of the film is advanced by the operator along the trackway into a particular chamber, the operator presses a switch to initiate an automatic three-phase cycle wherein: first, the slicer is actuated to sever the inserted section from the film strip whereby the tail of the severed section extends outside of the chamber-entry notch; second, the platform is indexed to shift the particular chamber into alignment with the pusher element, and at the same time to bring the adjacent chamber into alignment with the trackway in readiness for the next insertion; and third, the pusher element is actuated to engage the extending tail of the film section and to complete the insertion thereof.

For a better understanding of the invention, as well as other objects and further features thereof, reference is made to the following detailed description to be read in conjunction with the accompanying drawing, wherein:

FIG. 1 is a plan view of a microfiche master filled by a machine according to the invention;

FIG. 2 is a transverse section take in the plane 2—2 in FIG. 1;

FIG. 3 is a longitudinal section taken in the plane 3—3 in FIG. 1;

FIG. 4 is a perspective view of a reader-filler machine in accordance with the invention;

FIG. 5 is a separate view of the loading station of the machine onto which a jacket to be filled is placed;

FIG. 6 separately shows the clamping rod on the platform at the loading station;

FIG. 7 is a front elevational view of the machine;

FIG. 8 is an end view of the machine;

FIG. 9 is a plan view of the machine;

FIG. 10 is a perspective view of the pusher element;

FIG. 11 illustrates the position of the film when entering a particular jacket chamber;

FIG. 12 shows the position of the inserted film after being cut;

FIG. 13 shows the position of the jacket after film has been cut, the jacket having been indexed to align the tail of the cut film with the pusher element;

FIG. 14 shows the action of the pusher element to complete the insertion; and

FIG. 15 shows the relationship of the film tail with the nose of the pusher element.

THE MICROFICHE MASTER

Referring now to FIGS. 1 and 2, a microfiche master is shown constituted by a transparent, multiple-chamber jacket J having parallel channels or chambers A, B, C, D and E containing microfilm sections $F_1$, $F_2$, $F_3$, etc., the sections having been inserted by means of a reader-filler machine in accordance with the invention. The film sections may be composed of one or more microfilm images, depending on how they are cut. The sections need not be inserted at one time, and in practice, additional sections may be added to supplement an existing record.

Jacket J is constituted by two transparent rectangular panels 10 and 11 in superposed relation, the panels being formed of clear, flexible plastic material, such as cellulose acetate, Mylar, or any other suitable sheeting having high tensile strength. Interposed between the front and back panels and adhesively secured thereto are ribs of plastic or paper formed by longitudinally extending ribbons 12, 13, 14, 15, 16 and 17, in parallel relationship, to define the chambers A to E open at either end. The chambers are of like width to accommodate microfilm sections of a given size, such as 16 mm. film.

The back panel 10 is somewhat wider than front panel 11, to provide an extension onto which is adhered a translucent strip 18 for tilting the microfiche master. This title will be reproduced in contact-printing, because of the translucency of the strip.

To facilitate insertion of microfilm sections, transverse, generally rectangular notches 10A to 10E are cut into the back panel 10 adjacent the chamber opening. Front panel 11 is of exceptionally thin and clear plastic material to facilitate contact-printing, whereas back panel 10 is of relatively heavy-gauge transparent material to give body to the microfiche. The ribs are of substantially the same thickness as the inserted microfilm sections, or even thinner, so that no space exists between the top panel and the microfilm and the sensitive film is virtually in contact with the microfilm when contact-printing takes place.

Also provided are two locating holes 19 and 20 which are punched at longitudinally spaced positions between the tilting strip 18 and the first rib 12. It is important, when inserting microfilm strips, that the jacket on the platform of the film-feeding machine be precisely in parallel with the film path, particularly if the channel dimensions are effectively of the same width as that of the microfilm strip to be inserted therein. A slight displacement of the jacket from its proper parallel position makes insertion difficult, for then the strip tends to travel toward one side of the channel rather than through the channel, and jamming occurs. By the use of guide pins on the platform of the film-feeding machine adapted to receive the locating holes 19 and 20, proper registration of the jacket is ensured.

While the invention will be described as it operates to fill a microfilm jacket of the above-described type, it will be appreciated that the machine may be used to load other appropriate forms of multi-chambered items.

THE READER-FILLER MACHINE (General View)

Referring now to FIG. 4, there is shown an actual embodiment of a reader-filler machine in accordance with the invention. The microfiche jacket J to be filled is placed at a loading station on an inclined platform, generally designated by numeral 21, which is mounted on a carriage 22 which is movable in stepwise manner along a stationary bed 23. A microfilm roll is carried on a spindle-borne reel 24, and drawn therefrom is a continuous film strip 25 which is fed along a trackway through a film-advancing mechanism, generally designated by numeral 26, into a film slider and pusher station 27 which is adjacent the platform, the film to be inserted at this station being viewable through an optical system 28 which projects an image on the screen 29.

In operation, a jacket J to be filled is placed on the platform, and a chamber therein is aligned with the film trackway. The operator, who is able to view the microfilm images adjacent the film slicer and pusher station, turns the knob at the advancing mechanism 26 to insert into the chamber as many micro-image frames as desired. The operator is able to see on the screen 29 the position between the last frame to be inserted and the succeeding frame, and thereby to line up the knife midway therebetween. The operator then presses the switch button $B_S$ to initiate the operating cycle, wherein first the film is sliced, then the platform is indexed to align the chamber having the partially-inserted film with the pusher element, and to align the next chamber with the trackway, and finally the pusher element is actuated to complete the insertion.

THE JACKET LOADING STATION

As best seen in FIGS. 5 to 9, jacket J to be filled is laid down on platform 21 so that locating pins 30 and 31 attached to the platform enter the guide holes on the jacket. To maintain this relationship, a hinged, transparent plate 32 is provided, which may be of Plexiglass, and which has matching holes 30A and 31A therein, the plate folding down over the pins to lock in the jacket. The lower side of jacket J abuts a side gauge 33, while the rear end thereof engages a back gauge 34. The front portion of the jacket goes under a clamping rod 35, the front end being contiguous with the cutting edge of a cutting platen 36 having a film hold-down member 37 secured thereto. The undersurface of the hold-down member is contoured to prevent curling of the jacket, the member having two indentations 37A and 37B therein which are aligned with the feed-in notches of parallel chambers in the jacket.

As separately shown in FIG. 6, clamping rod 35 is supported in suitable bearings on the platform and provided with a series of spring-biased pins 35A, 35B, etc., which register with the corresponding series of ribs in the jacket to hold the jacket on the platform. Rotation of rod 35 is effected by a manually-operated lever 38 so that in a clamping position, the pins are perpendicular to the jacket ribs and press downwardly thereon, while in a release position, the pins are displaced from the ribs and apply no pressure thereto.

The placement of a jacket on the platform ensures precise positioning of the jacket with respect to the film to be inserted therein, for the position of the jacket is held both by the guide pins and the clamping bar. In operation, the film roll is mounted on the supply reel so that the film unwinds with its curl and emulsion down. Jacket J is placed on the platform with notches 10A to 10E exposed at the front end of the platform to receive the advancing film. Thus while in FIG. 1, the jacket is shown with the notches on the underside, when filling the jacket, the notches are presented on the platform at the upper side at an angle to the approaching film.

Platform 21, as noted previously, is supported on carriage 22, which rides on rails on a bed 23. The carriage is spring-loaded and includes an escapement mechanism, the arrangement being such that when switch button $B_S$ is pressed, a solenoid acts to release the escapement to cause the carriage to index an amount equivalent to one chamber.

Initially the carriage is positioned against the action of its spring, so that the uppermost channel A in jacket J is in line with the film trackway. When button $B_S$ is pressed, carriage 22 is indexed one step to shift channel A into alignment with a pusher, to be later described, and channel B with the film trackway. When button $B_S$ is again pressed, channel B is then brought into line with the pusher element, and channel C with the trackway, and so on with subsequent shifts in carriage position.

Manual indexing may be effected by a control lever L which acts to release the escapement mechanism. After the platform is fully shifted and the jacket is filled, it is returned manually to its initial position for loading the next jacket.

THE FILM-ADVANCING MECHANISM AND FILM-SLICING STATION

As best evident in FIGS. 7, 8 and 9, the film web drawn from reel 24 travels along a horizontal trackway formed by a pair of guide rails 39 and 40, the advancing mechanism 26 being adjacent the input of the trackway which terminates at film-slicer and pusher station 27. The advancing mechanism includes a knob-operated roller 41 acting in conjunction with a pressure roller 42, the film passing between the two rollers. An electrostatic brush $E_b$ is mounted on the advancing mechanism in the path of the film trackway to remove dust and other foreign matter from the surface of the film.

Mounted at a position parallel with the trackway in registration with the chamber adjacent to the chamber in line with the advancing film, is a reciprocating pusher element 43. As shown separately in FIG. 10, this element is constituted by a nose portion 43A which is contoured to engage the tail of the cut film, a shank portion 43B, and a head portion 43C. The pusher element is shifted toward the jacket by means of a cable 44, the rear extremity of which rides on the surface of a motor-driven cam $C_m$, whereby in the course of cam rotation, cable 44 is projected from its sheath 44A and strikes head 43C, causing displacement of the pusher element in the direction of the jacket. The pusher element rides up the inclined surface of platen 36 and thereby pushes the film tail into the notch of the chamber. The position of pusher element 43 is maintained by means of a flat spring 43D which bears downward thereon. When cable 44 is withdrawn, pusher element 43 is retracted by means of an expansion spring 46.

A blade 47 mounted for reciprocation with respect to the cutting edge of platen 36, serves to slice the film. Blade 47, which is spring-biased to maintain it normally in a raised position, is actuated through a lever arrangement by a suitable solenoid $S_o$, which is energized when button $B_S$ is pressed, the action of the cutting blade being followed by indexing of the platform.

THE READER

The microfilm images on the film strip, which lies directly adjacent the cutting position, are illuminated by a lamp 48, as shown in FIG. 7, and are projected through an optical lens system 49 onto a mirror 50, the enlarged image being reflected thereby onto screen 29. The lens system includes the usual focusing means.

The optical arrangement is such that the knife edge of blade 47 and the microfilm image adjacent thereto, are both visible on the screen. Hence the operator is able to determine the exact point between successive image frames where cutting will take place and thereby verify the image before insertion takes place. As the operator turns the knob of the advance roller 41, the movement of the film is projected on the screen.

OPERATION OF THE MACHINE

In FIGS. 11 to 15, the manner in which the jacket chambers are filled, is illustrated in simplified form. Referring first to FIG. 11, we see film 25 being inserted into notch 10D of channel D of the jacket, the cutting blade 47 being raised. When the cycle switch button $B_S$ of the machine is pressed, the following events occur in sequence.

First, as shown in FIG. 12, knife 47 is actuated, thereby cutting a section of the film from the strip 25, a tail T of this section extending from notch 10D. The length of this tail is equal to the distance between the notch and the front end of the jacket, since cutting takes place at this end.

Second, as shown in FIG. 13, the platform is indexed and the leading edge of film 25 is now aligned with notch 10E in chamber E, while notch 10D with tail T extending therefrom, is aligned with pusher element 43.

Third, the pusher element 43 is projected in the direction of the jacket, and the nose 43A therein, as shown in FIG. 15, engages tail T, and rides up platen 36 to push the tail into notch 10D as illustrated in FIG. 14, thereby completing the insertion.

While there has been shown a preferred embodiment of microfiche reader-filler machine in accordance with the invention, it will be apreciated that many changes and modifications may be made therein without, however, departing from the essential spirit of the invention as defined in the annexed claims.

I claim:
1. Apparatus for cutting a microfilm strip into sections and for inserting the sections into chambers of a protective jacket, each chamber having an inwardly displaced film entry notch adjacent the front end of the jacket, said apparatus comprising:
 (a) a platform for supporting said jacket,
 (b) a trackway for conveying the film strip toward said platform for insertion in the entry notches of said jacket,
 (c) indexing means to position said platform relative to said trackway thereby to register said film strip in said trackway with successive entry notches on said jacket, whereby a section of said strip may be inserted into a particular chamber,
 (d) a cutter interposed between said platform and said trackway to sever the inserted section from said strip whereby a tail thereof extends from the particular film entry notch,
 (e) pusher means for inserting the tail into the chamber disposed parallel to said trackway in registration with said film entry notch adjacent the particular film entry notch into which said film strip is about to be inserted, wherby when the platform is indexed the tail is then in line with said pusher, and
 (f) cycling means to cause a sequential action in which first said cuter is actuated, then said platform is indexed, whereby the trackway is aligned with the next entry notch in readiness for inserting another section of film, and finally said pusher is advanced to push in said tail to complete the insertion.

2. Apparatus as set forth in claim 1, further including optical means to project an image of said cutter and the adjacent image on said strip on a viewing screen to verify the section to be inserted.

3. Apparatus as set forth in claim 1, wherein said platform is inclined to facilitate the angular insertion of film into said jacket.

4. Apparatus as set forth in claim 1, wherein said pusher means includes a nose portion contoured to engage the tail of said film.

5. Apparatus as set forth in claim 1, further including a cam-operated, ensheathed cable which is caused in the course of a cam rotation to extend outside of said sheath to engage and advance said pusher means.

6. Apparatus as set forth in claim 1, wherein said jacket is a microfiche jacket having location holes, and said platform includes guide pins to maintain said jacket at the proper position.

References Cited

UNITED STATES PATENTS

| | | | |
|---|---|---|---|
| 2,892,295 | 6/1959 | McArthur | 53—123 |
| 2,937,483 | 5/1960 | Engelstein | 53—123 |
| 3,019,579 | 2/1962 | Heckman | 53—123 |
| 3,141,275 | 7/1964 | Anderson et al. | 53—123 |
| 3,141,276 | 7/1964 | Anderson et al. | 53—123 |
| 3,248,846 | 5/1966 | Engelstein | 53—123 |

NORTON ANSHER, Primary Examiner

RICHARD M. SHEER, Assistant Examiner

U.S. Cl. X.R.

353—77